T. B. MURRAY.
FRICTION CLUTCH.
APPLICATION FILED JAN. 10, 1917.
1,239,940.
Patented Sept. 11, 1917.
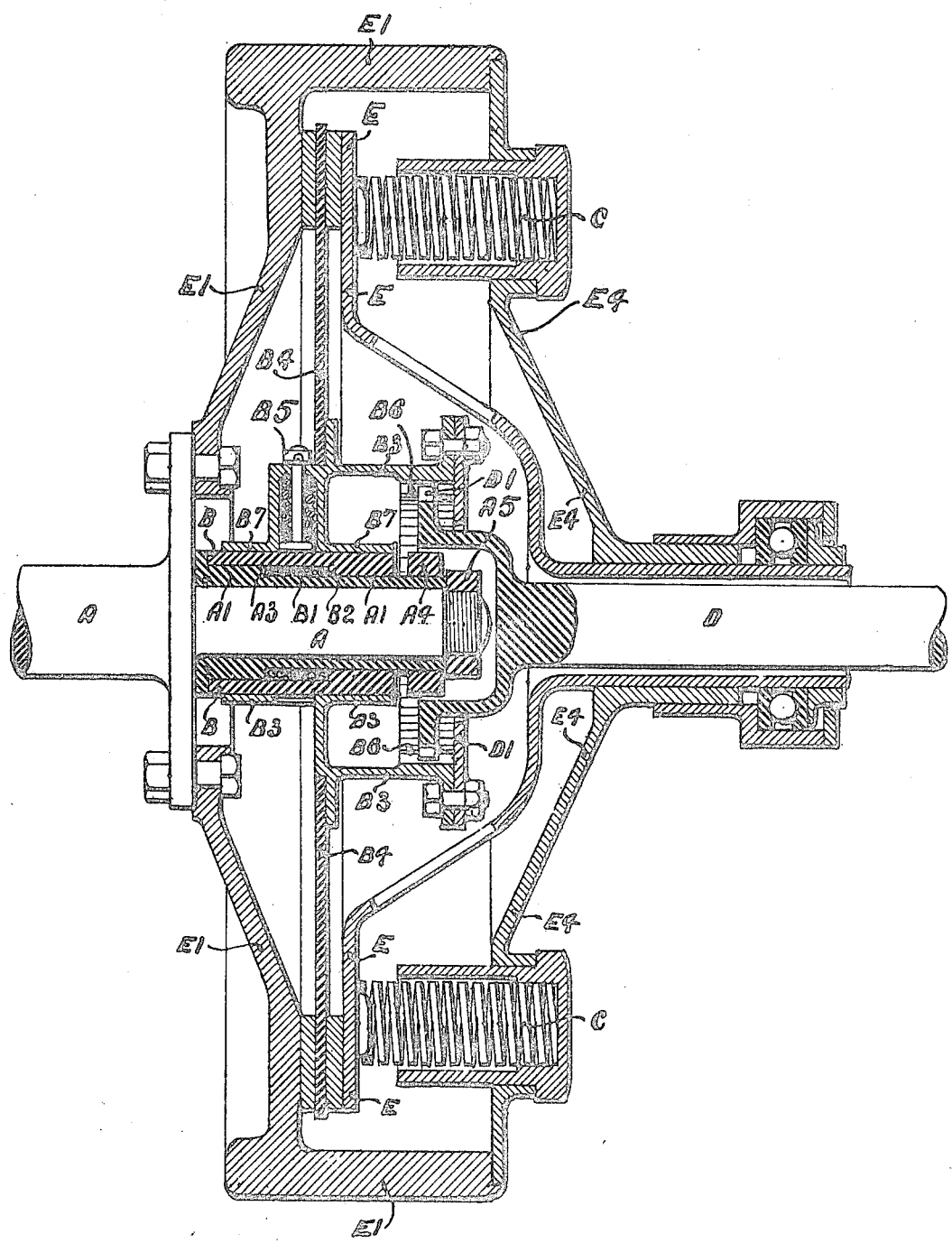
INVENTOR
THOMAS BLACKWOOD MURRAY
BY Howson and Howson
ATTORNEYS

UNITED STATES PATENT OFFICE.

THOMAS BLACKWOOD MURRAY, OF SCOTSTOUN, SCOTLAND.

FRICTION-CLUTCH.

1,239,940.   Specification of Letters Patent.   Patented Sept. 11, 1917.

Application filed January 10, 1917. Serial No. 141,609.

*To all whom it may concern:*

Be it known that I, THOMAS BLACKWOOD MURRAY, a subject of the King of Great Britain and Ireland, and a resident of Scotstoun, in the county of Renfrew, Scotland, have invented certain new and useful Improvements in Friction-Clutches, and of which the following is the specification.

The invention relates to friction clutches of the "single-plate" type in which a plate or disk usually the driven member lies between two other disks or annuli which are caused to engage it on opposite sides.

The invention has for its object primarily to provide improved simple and effective means for definitely separating these three members—the outer annuli or disks and the disk—between them—from one another when the clutch is disengaged, and secondarily has for its object to provide improved driving connection between the outer annuli or disks.

According to the first part of the invention a sleeve is mounted freely on the driving shaft, or on a sleeve thereon, or on the driven shaft; and mounted on the sleeve is the intermediate driven disk of the clutch. The sleeve is urged in the direction of disengagement by a spring of lesser intensity than the clutch actuating spring or springs. An adjustable stop limits the travel of the sleeve urged by its spring. Between the sleeve and the disk on it is a frictional device such as to retain the disk normally in a given position but not sufficient to resist its movement by the main clutch spring. Thus, when one of the outer driving annuli or disks is as usual withdrawn to free the clutch, the intermediate disk, urged by the spring engaging the sleeve on which it is, leaves the other driving disk, and by the stop on the sleeve is retained also out of contact with the moved driving disk. As the position of the disk upon its sleeve is frictionally determined by a resistance which the main clutch spring can overcome, it follows that each time the clutch is put into engagement, a correction of the disk's position is applied and has effect if necessary—thus there is maintained, notwithstanding wear or relative movement due thereto of the clutch parts, a correct adjustment of the driven disk relatively to the disks which engage it, and such that it is freed practically an equal distance from each of them on complete disengagement. Any convenient driving connection is arranged between the driven disk and the shaft which it drives.

According to the second part of the invention, instead of the movable driving disk being connected to its companion disk by keys, feathers, or the like, it is connected by one or more members preferably arranged tangentially and flexible in the direction of the axis of the clutch.

An illustrative example of the carrying out of the invention is shown on an accompanying sheet of explanatory drawings in sectional side elevation.

According to this example there is fixed upon the driving shaft A a sleeve $A^1$. Freely mounted upon this sleeve is the endwise movable sleeve B, the spring $B^1$ of which is arranged between an internal shoulder $B^2$ on it and an external shoulder $A^3$ on the sleeve $A^1$. On the sleeve $A^1$ is a collar $A^4$ limiting the outward movement of the sleeve B and adjustable in any convenient manner—for example, by a nut $A^5$ holding the sleeve $A^1$ on the shaft A.

On the sleeve B is a sleeve $B^7$ having a cylindrical part $B^3$ connected to it by a web, and on a flange on this is mounted the driven disk $B^4$ of the clutch.

The endwise movement of these parts B, $B^3$, $B^4$ upon the sleeve $A^1$ is controlled by the friction of a series of radially arranged spring-urged plungers $B^5$ arranged in cavities in the web of the sleeve $B^3$ and engaging the periphery of the sleeve B. The frictional resistance of this device is such that while it is readily overcome by the usual clutch-engaging springs C it resists the pressure of the sleeve spring $B^1$.

Engagement between the driven member with its disk $B^4$ and the driven shaft D is by means of an internally toothed ring $B^6$ within the cylindrical part $B^3$ which is engaged by a counterpart disk $D^1$ formed on the inner end of the driven shaft D.

The operating gear applied to the member E is of usual form.

What I claim is:—

1. In a clutch of single plate type, an intermediate driven disk, a sleeve carrying the same, spring means for closing the clutch, a spring of lesser strength tending to open the clutch, an adjustable stop limiting the travel of the sleeve together with a frictional device between the disk and the sleeve tending to hold the disk normally in given position but insufficient to prevent the displacement of the disk by the clutch closing spring.

2. In a structure such as defined in claim 1, the construction of the frictional device between the disk and disk-carrying sleeve as a series of radially arranged spring-pressed friction plungers carried by the disk and engaging the disk-carrying sleeve.

3. In a construction such as recited in claim 1, the provision of a shouldered driving sleeve upon which the disk-carrying sleeve is carried, the latter being provided with a shoulder between which and the shoulder on the driving sleeve a spring is interposed.

In testimony whereof I have signed my name to this specification, in the presence of two subscribing witnesses.

THOMAS BLACKWOOD MURRAY.

Witnesses:
WILFRED HUNT,
JAMES EAGLESOM.